R. W. VAIL.
BURGLAR ALARM SYSTEM.
APPLICATION FILED AUG. 7, 1916.
1,238,363.
Patented Aug. 28, 1917.
10 SHEETS—SHEET 8.
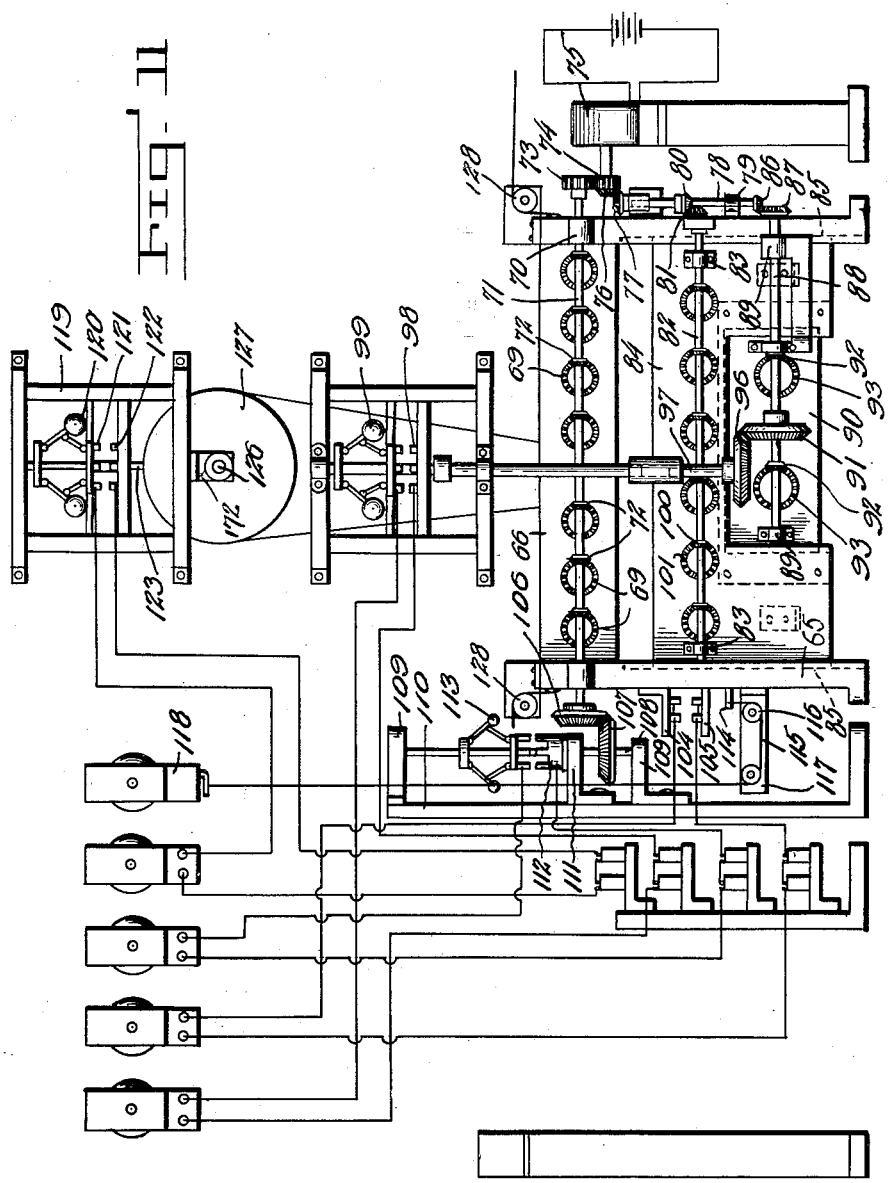
Robert W. Vail,
Inventor
By Jerry A. Mathews,
Attorney

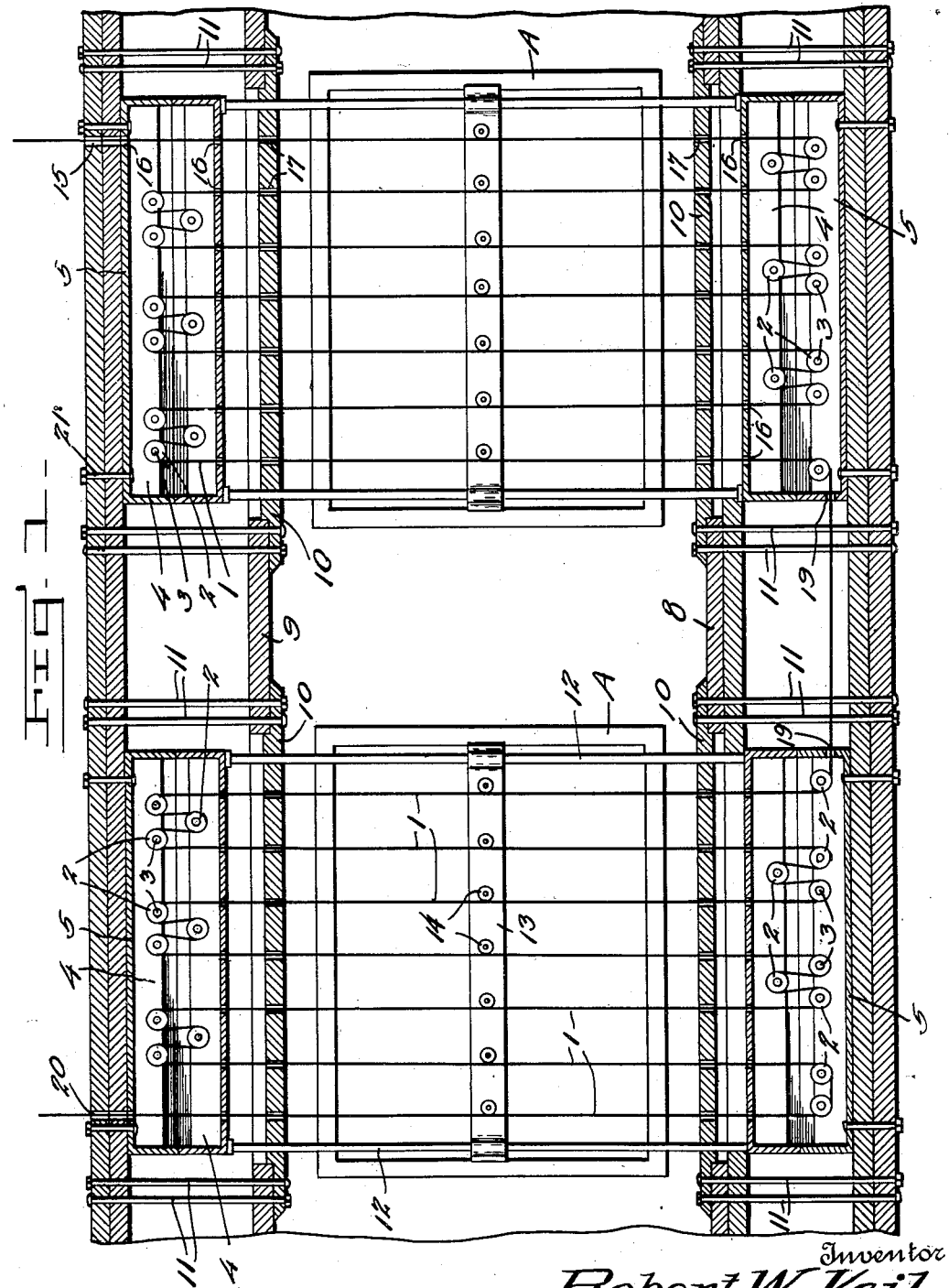

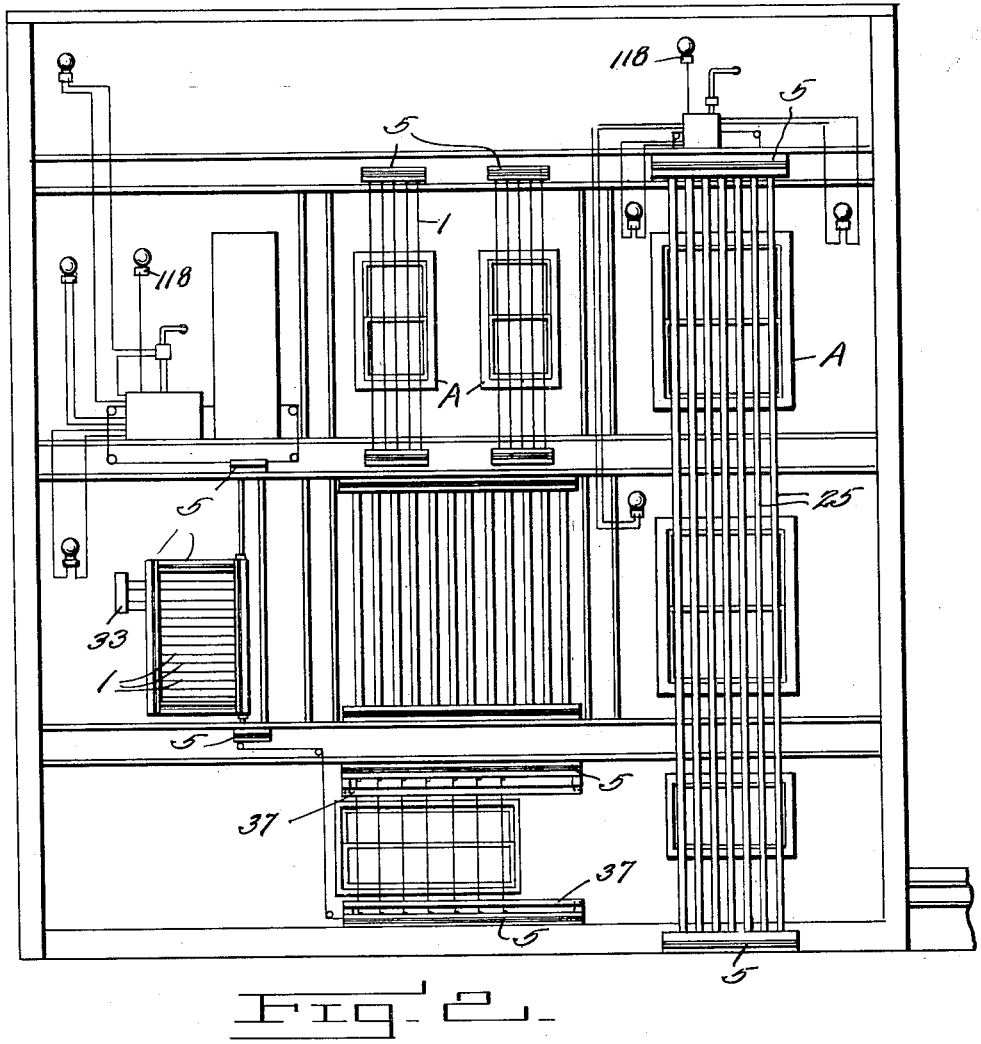

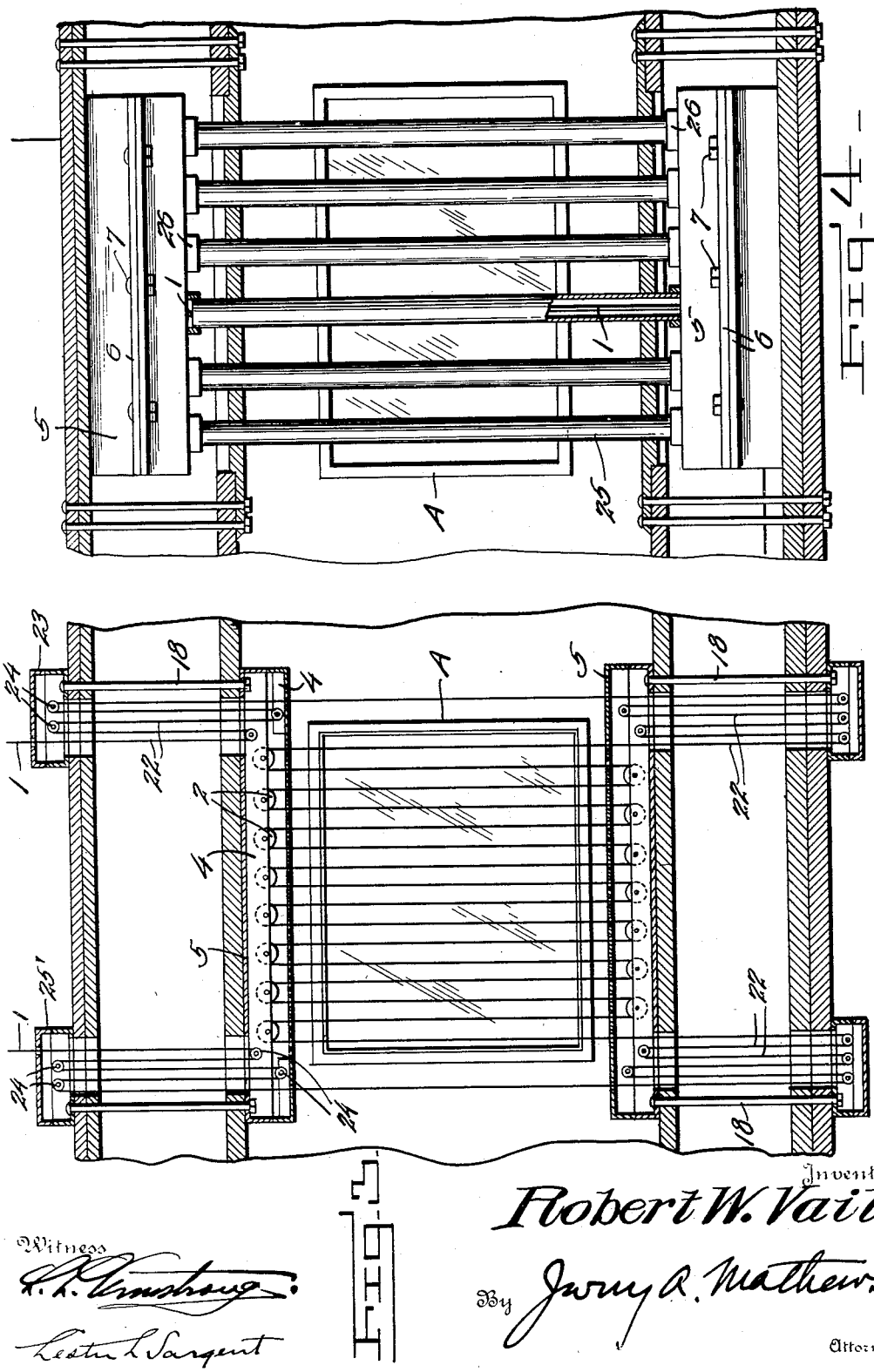

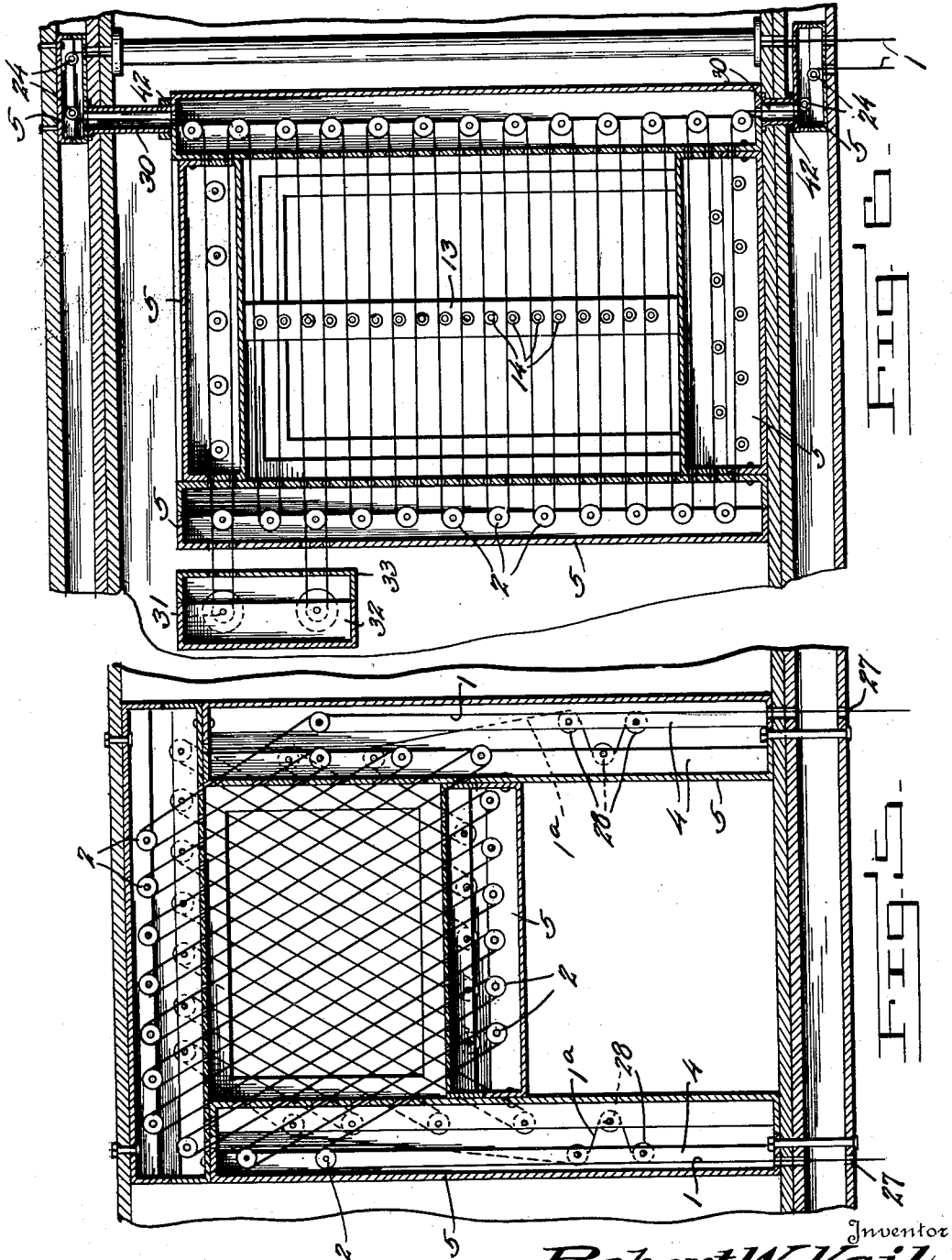

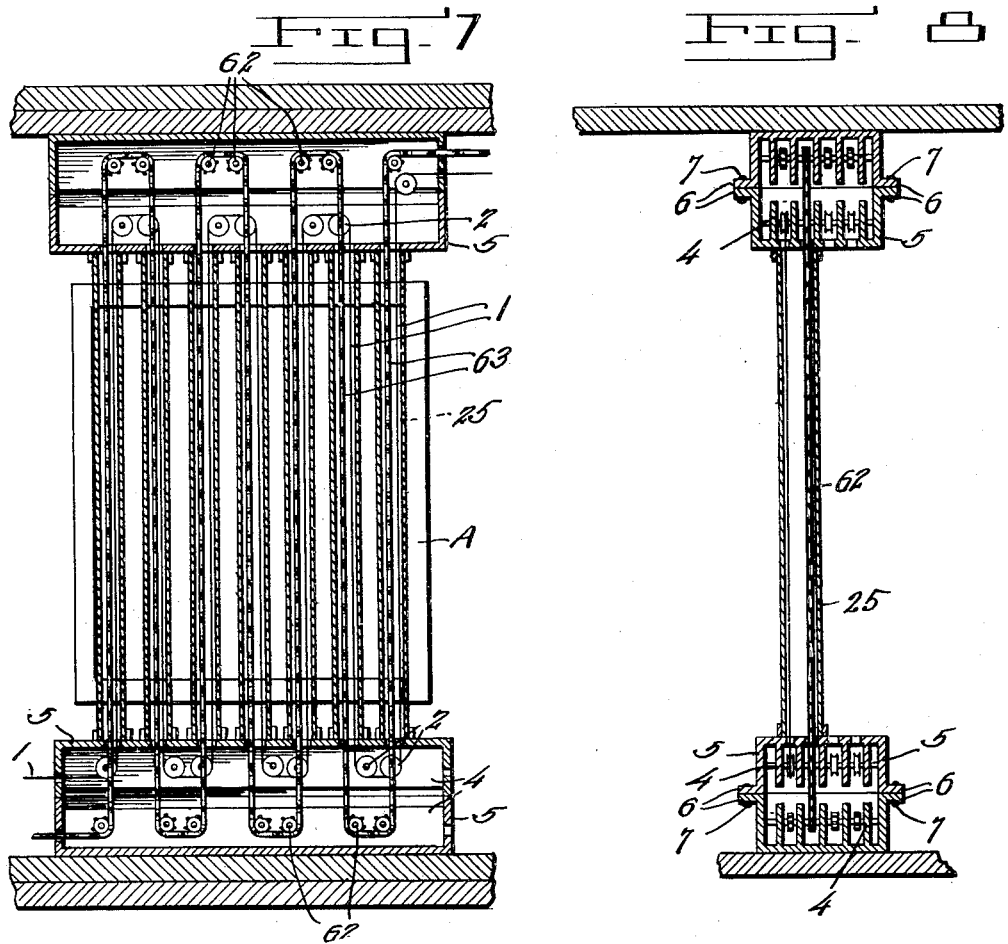

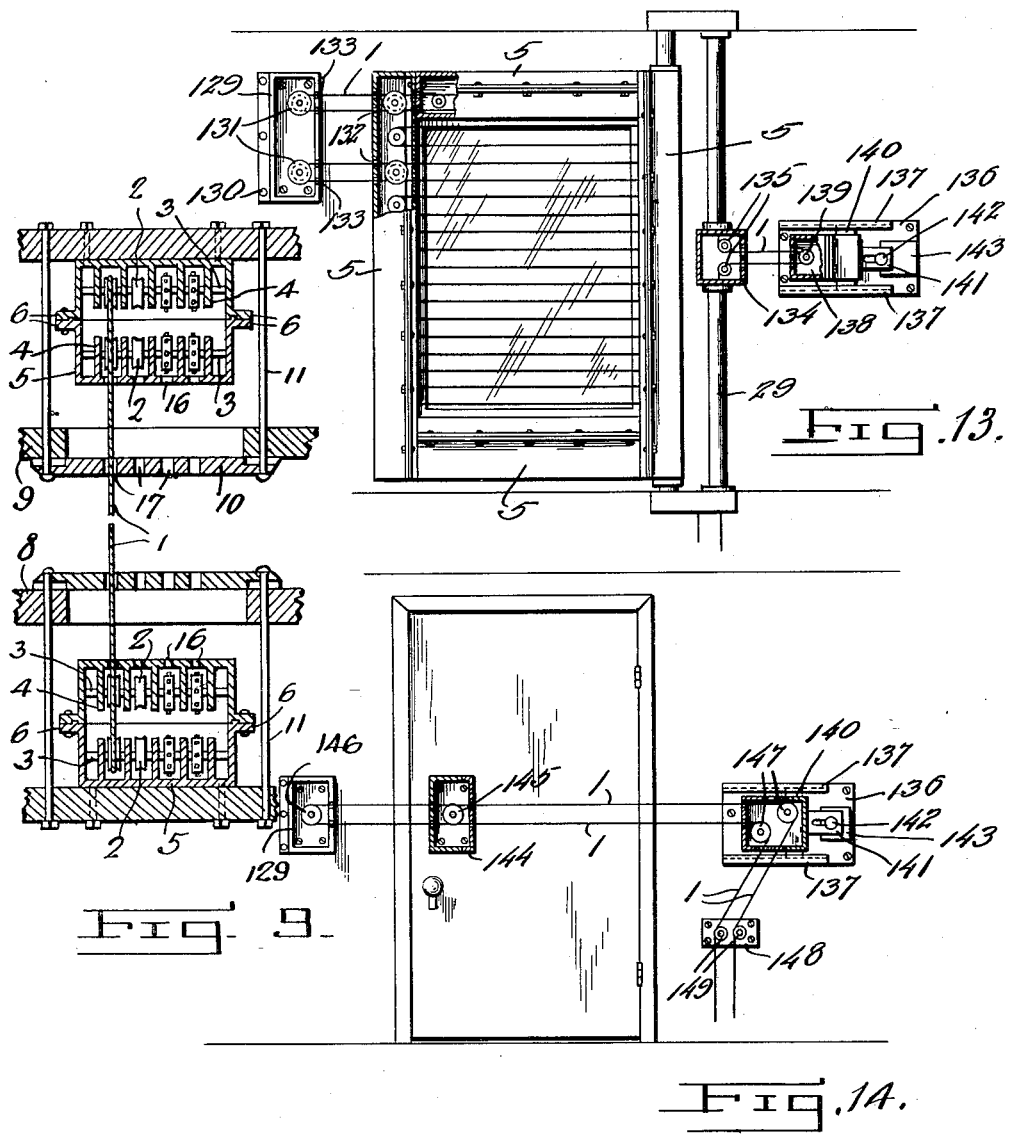

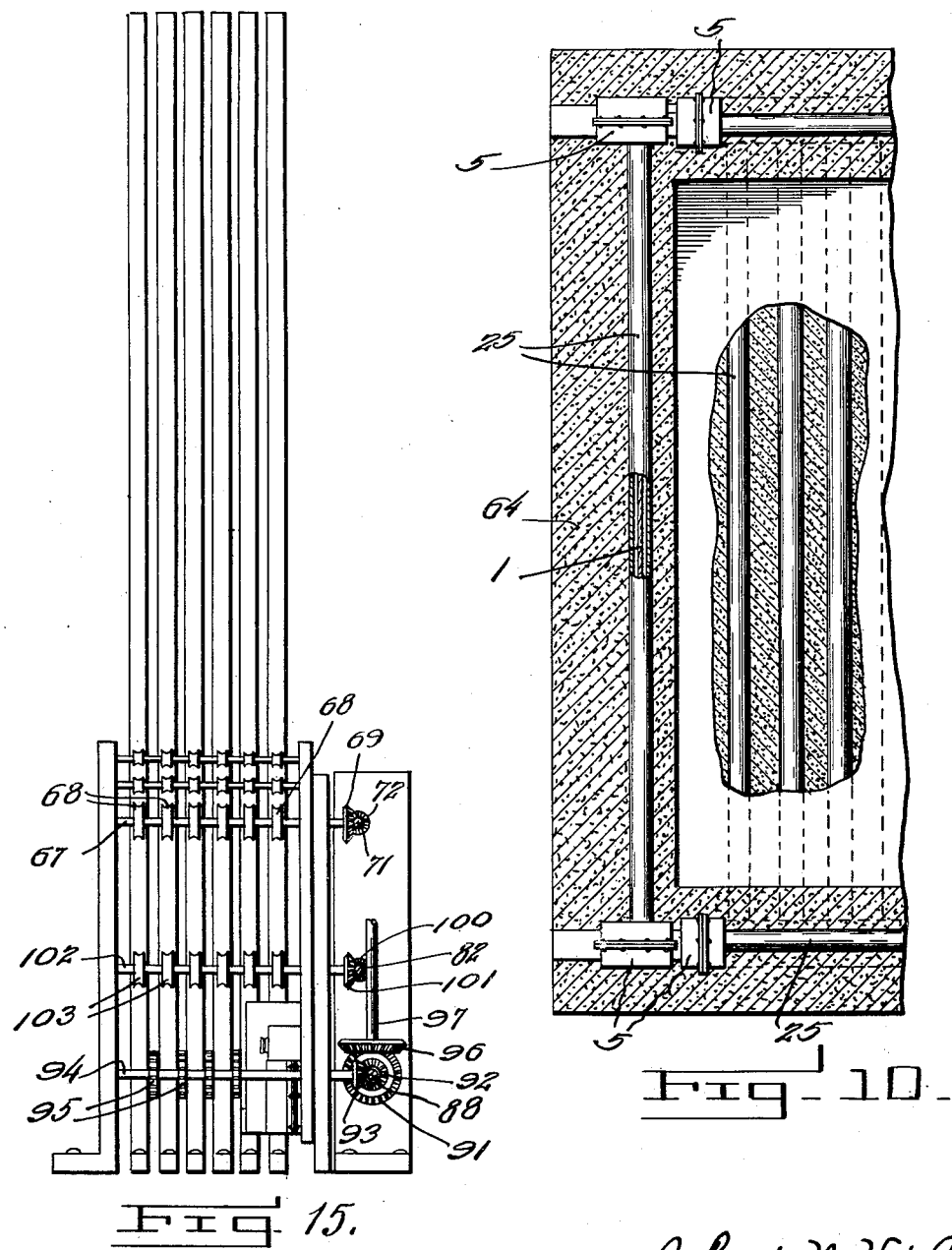

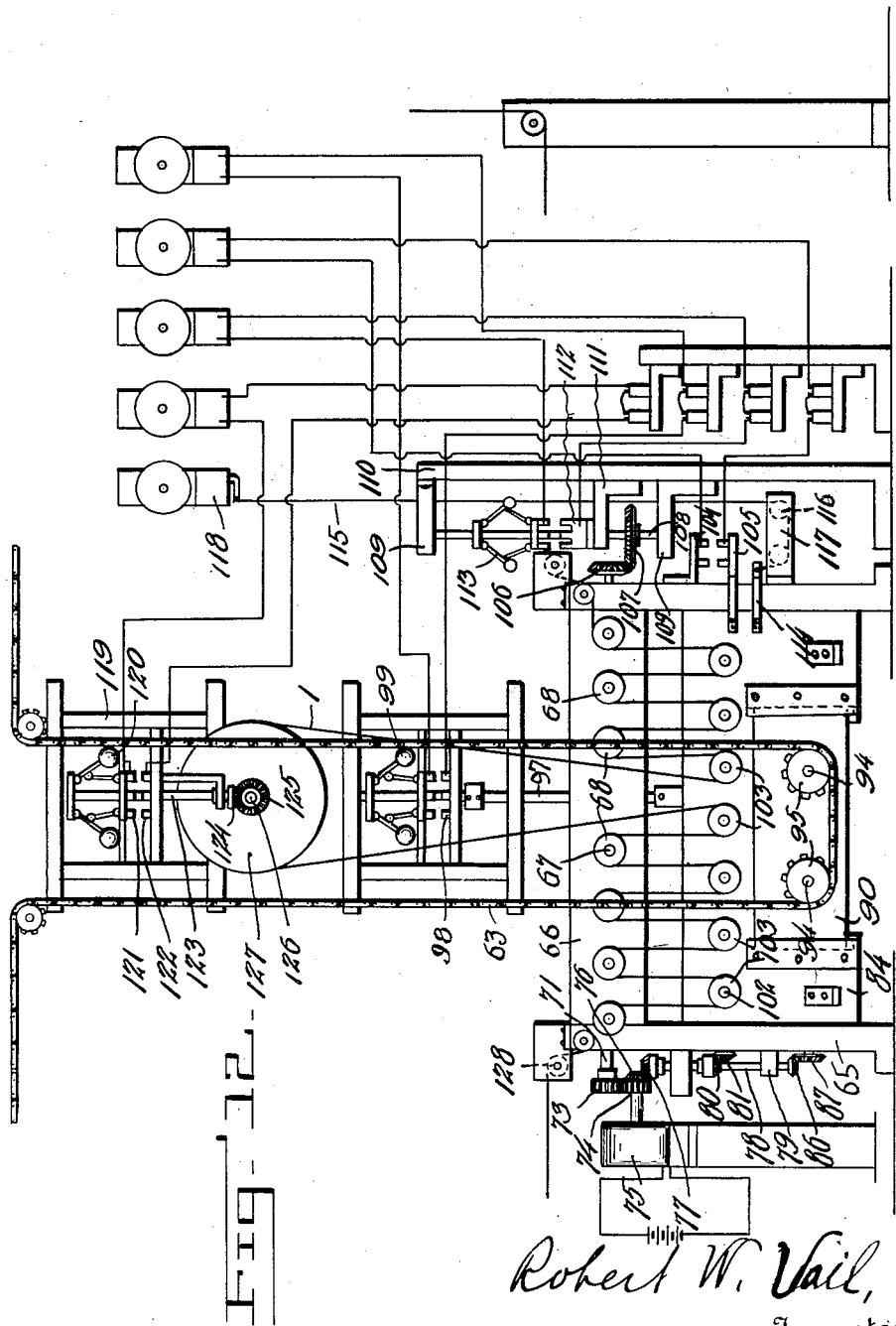

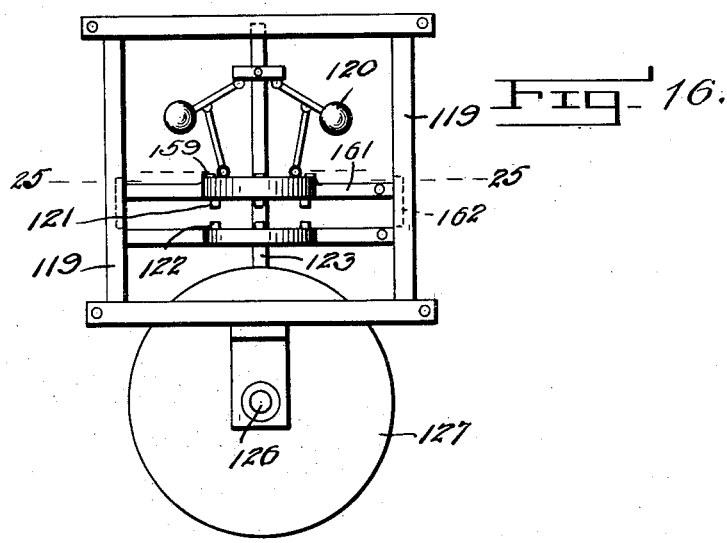
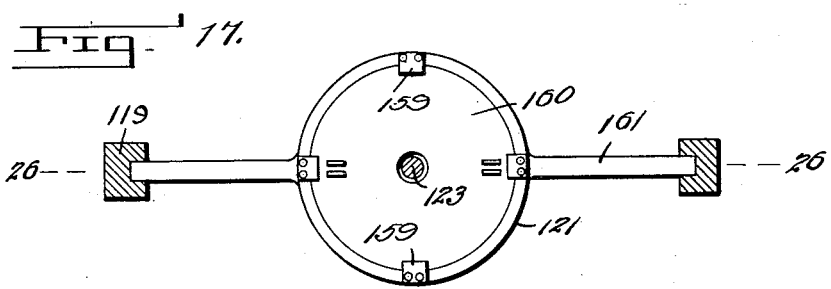
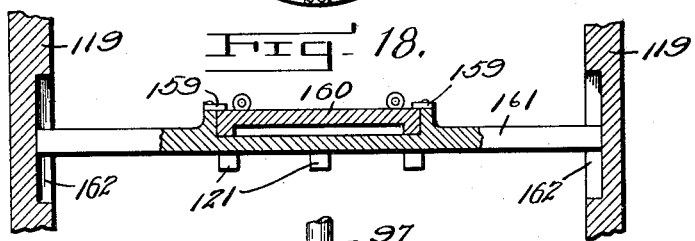
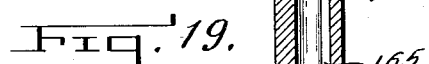

UNITED STATES PATENT OFFICE.

ROBERT W. VAIL, OF NEW YORK, N. Y.

BURGLAR-ALARM SYSTEM.

1,238,363.

Specification of Letters Patent.    Patented Aug. 28, 1917.

Application filed August 7, 1916.   Serial No. 113,609.

*To all whom it may concern:*

Be it known that I, ROBERT W. VAIL, a citizen of the United States, residing at New York, in the county of New York and State of New York, have invented a new and useful Burglar-Alarm System, of which the following is a specification.

The object of my invention is to provide a novel system for the protection of residences, banks, vaults, etc., against robbery. It is also an object of my invention to provide a system to prevent the escape of convicts through windows, doors or walls of the prison and which will sound an alarm when any such attempt to escape is made. It is an especial object of my invention to provide a device having a constantly traveling endless cord so disposed that any attempt to pass through windows, doors or walls where it is arranged will result in the immediate sounding of an alarm, and to provide a mechanism that can not be successfully tampered with inasmuch as any interference with its predetermined and continuous movement will sound an alarm. It is further my object to provide as a part of the system novel, preferably electrically-controlled, alarm mechanism operatively connected with the mechanism protecting windows, doors, walls and so forth. It is further my object to provide novel combinations of continuously operating cords, wires or chains, whereby to increase the difficulties of tampering with the system. It is also my object to provide novel means whereby any authorized person may shove aside from doors or windows the mechanism disposed over such doors or windows, without interfering with the successful and continuous operation of the traveling cords, wires or chains. It is further my object to provide novel means for adjusting the mechanism of the system and to provide novel arrangements and combinations of parts as more fully set forth hereinafter in connection with the accompanying drawings illustrative of the invention.

I attain the objects of my invention by the mechanism illustrated in the accompanying drawings, in which—

Figure 1 is a view of two windows illustrating the manner of disposing of the continuously traveling endless strand from one window to the other; Fig. 2 is an elevation of the invention applied to several stories of a house; Fig. 3 is a view of a window having extended casings in which the continuously traveling strand is operated to prevent tampering; Fig. 4 is a view of the pipes used to incase the traveling cord when the invention is applied to the windows and doors of prisons; Fig. 5 is a view of the endless strand applied in a double diagonal arrangement to a window; Fig. 6 is a view of the endless strand applied in a horizontal arrangement across a window, with means for adjusting the device; Fig. 7 is a view of a window to which both an endless chain and an endless cord or wire are applied to increase the protection afforded by the system; Fig. 8 is a vertical cross section of Fig. 7; Fig. 9 is a vertical cross section of Fig. 1; Fig. 10 is a view showing the walls, ceiling and floor of a room reinforced and guarded by the invention; Fig. 11 is a front view of the mechanism for feeding the endless strand, with the electric alarm mechanism, the circuits of the alarm being shown in diagram; Fig. 12 is a rear view of Fig. 11; Fig. 13 is a view of a compensating or adjusting device applied to the invention, a specially constructed protective door being shown; Fig. 14 is a view of the compensating or adjusting mechanism applied to the invention with an ordinary door; Fig. 15 is an end elevation of combined roller and ratchet driving mechanism. Fig. 16 is an enlarged detail of the governor mechanism; Fig. 17 is a horizontal section on line 25—25 of Fig. 16; Fig. 18 is a vertical section on line 26—26 of Fig. 17; and Fig. 19 is a detail of telescopic rod 97.

Referring to the accompanying drawings, I provide a suitable cable 1 of any suitable material. Cable 1 travels over rollers 2, which are mounted on shafts or axles 3 which extend the width of the casement and are mounted in flanges 4 in casements 5. The flanges 4 extend the length of the casements and may be provided on opposite sides of the casement as in Fig. 1, or a single flange may be provided as in Fig. 6. The casements 5 are box-like structures having outturned or lateral flanges 6 fastened by bolts 7, as shown in Fig. 4. Casements 5 are mounted as required. In Fig. 1 they are shown set into the floor 8 and ceiling 9 by means of a trap 10 which is removably held in place by bolts 11. The upper and lower casements 5 are fastened and supported by rods 12 on either side of the windows A. Connecting the two rods or standards 12 is a cross bar 13, supporting suitable anti-vibration rollers 14. As shown in Fig. 1, cable 1 enters through an aperture 15 into the casement 5 above one of the windows, passing through aperture 16 in the casement the latter aperture being alined with aperture 15 above the casement. The cable thence passes through an opposite aperture 16 in the casement and through an aperture 17 in trap 10, across the window A, and through a corresponding aperture 17 in the trap 10 below the window, and through aperture 16 in the end of casement 5 below the window, and around rollers 2, up and down across the window as shown until it has been completely protected and out through an aperture 19 in the end of casement 5 through the space between the members of the floor section 8. The cable 1 thence passes through an aperture 19 in the casement below the adjacent window, and is thence wound in and out in similar manner to that previously described so as to completely protect the window, and thence passing out through an aperture 20 in the ceiling member 9 of the second window. Casements 5 are secured in place by bolts 21.

Referring to Fig. 3, a modified form of the invention is illustrated in which the casements 5 are disposed below the ceiling and above the floor, respectively. A single series of suitable rollers 2 are provided in each of the casements. In each of the four corners around the window I provide an auxiliary extended protective mechanism, consisting of an extension of the endless cable 1 over rollers 24 in a small auxiliary casement 23. Casements 23 and 5 are interlocked by bolts 18, as shown in Fig. 9. This arrangement renders tampering with the device much more difficult, since any shifting of the wheels or cords will result in the ringing of an alarm by the means hereinafter described. The cable 1 traverses the small rollers 24, as shown in Fig. 3, after entering casement 23, and thence travels to the corresponding casement 23 below the window, thence from rollers 24 to rollers 2 back and forth across the window to the casement 23 in the opposite corner of the window, over the rollers 24, and to the fourth casement 23 and around the rollers 24, as shown in Fig. 3.

Referring to Fig. 4 there is shown a modified form of the device in which the endless cable 1 traverses back and forth from the casements 5 above and below the window through suitable pipes 25. These pipes are held in place by keeper rings 26, suitably secured to casements 5. This construction is especially designed for prisons and banks, where it may be desired to have the windows barred, in addition to the protection furnished by the alarm system. The pipes may be of any desirable dimensions and arranged wherever it is desired to extend the endless cable 1, and may be disposed between walls, between floor and ceiling, or exterior to the walls.

Referring to Fig. 5, it is within the contemplation of my invention to provide an overlapping or double arrangement of endless cables to protect a window, door or other part of a building, such as illustrated in this view. The window frame is composed of casements 5 suitably bolted together. In each of the casements 5 are mounted rollers 2. Cable 1 enters through a suitable aperture 27 and traverses rollers 2 in a diagonally alined arrangement as illustrated across the window and thence out through a similar aperture 27. A second cable 1ª enters through an aperture (not illustrated) similar to and alined with aperture 27, and thence traverses rollers 28 on opposite sides of flanges 4 from rollers 2, the cable 1ª also being disposed in a diagonal arrangement across the window in the reverse direction from the arrangement of cable 1, as shown. It is however, within the contemplation of my invention to make any desired arrangement of two or more endless cables disposed at any desired angle across a window or wall in an alarm system.

Referring to Fig. 6 another mode of arranging a protective endless cable over a door is shown. The outer portions of the door are formed by four casements 5, suitably fastened together by screws or bolts. Rings 42 are rigidly affixed to one of the casements 5, and engage over pipes 30, as shown, to permit of swinging the door open. In Fig. 6 a horizontal arrangement of windings of the cable 1 is provided over a series of rollers 2 in opposite casements of the door, the cable being supported by antivibration rollers 14 mounted on a suitable cross bar 13. Cable 1 enters through a suitable pipe 1 and passes over suitable rollers 24 in a small casement 5 mounted to the ceiling, and thence through pipe 30 to the door casements 5. As a means of locking the door with the cable 1, a locking device or casement 33 is provided at one side of the door. This casement is provided with rollers 31 mounted on a suitable flange 32 projecting from the wall of the casement 33, as shown in Fig. 6. To open the door slack cable is given by means of the slack supply device, illustrated in detail in Fig. 17 and described more fully hereinafter, and the cable slipped off from rollers or guide wheels 31, and the door opened. To lock the door it is first closed and then the portions of the cable opposite to or in alinement with guide wheels 31 is slipped in place over these guide wheels, and the endless cable is then drawn operatively taut by the slack supply device shown in Fig. 17. The locking device may consist of one or more guide wheels 31 in locking casement 33, as desired, such locking casement being accessible only to an authorized person. After cable 1 has traversed the door in any desired arrangement in the casements, such for example as illustrated in Fig. 6 it is then passed through pipe 30 over rollers 24 in lower casement 5, and thence on to the alarm sounding mechanism hereinafter described.

Referring to Figs. 7 and 8, an arrangement of my invention is illustrated in which a sprocket chain is operated in conjunction with the endless cable. I provide suitable casements 5 mounted above and below the window C. These casements are provided in one half with sprocket wheels 62 over which run sprocket chains 63. In the opposite half of each casement are mounted grooved rollers 22 over which cable 1 operates. As illustrated in dotted lines in this view, the chain and cable may operate in suitable pipes 25.

Referring to Fig. 10, there is illustrated a method of protecting an entire room, all of the alarm mechanism being concealed. The mechanism consists of a series of pipes 25, connected by suitable casements 5, the pipes being embedded in the wall. Within the pipes and casements an endless cable 1 operates as disclosed in other views.

Referring to Figs. 11 and 12, there is illustrated a method of propelling the endless cable together with means for sounding the alarm whenever the endless traveling cable 1 is tampered with at any point. I provide two standards 65, connected at the upper end by a cross bar 66. On member 66 are mounted shafts 67, on one end of which are mounted small pinions 69. Mounted in bearings 70 on the standards 65 is a shaft 71 on which are pinions 72 meshing with the pinions 69. On one end of the shaft 71 is a gear 73 which meshes with a gear 74 on the drive shaft of the motor 75, as illustrated in Fig. 15. On the face of the gear 74 is mounted a beveled pinion 76 to which is meshed a pinion 77 on a telescoping shaft 78. Shaft 78 is mounted in bearings 79, carried by the standard 65. Keyed to the lower member of the telescoping shaft 78 is a beveled pinion 80, which meshes with a bevel gear 81 on a shaft 82 supported in bearings 83 secured to a sliding plate 84. The inner faces of the standards 65 are provided with grooves 85 in which the member 84 has vertical movement. On the lower end of the shaft 78 is a beveled pinion 86 to which is meshed a pinion 87 mounted on a shaft 88 in bearings 89 carried by a plate 90, having a limited vertical movement relative to plate 84, any suitable means (not illustrated) being employed to retain plate 90 in contiguous relation to plate 84. On the shaft 88 are mounted a large beveled pinion 91 and two smaller pinions 92. The smaller pinions 92 are in mesh with pinions 93 carried by stub shafts 94, which extend through plate 90 and are provided on their opposite ends with sprocket wheels 95. The endless chain 63 is propelled by sprocket wheels 95.

The large gear 91 is in mesh with a gear 96 carried by a governor shaft 97, to the upper end of which is provided an electric contact 98 which acts as one pole of a switch controlled by governor 99 mounted on the shaft 97. The other pole of the switch is attached to and controlled by the governor. The switch is normally held open when the device is running.

The shaft 82 has mounted thereon a series of beveled gears 100 which mesh with gears 101 mounted on stub shafts 102 carried by the movable plate 84. To the opposite end of the stub shafts 102 are mounted grooved rollers 103. Carried by one of the frame members 65 is a contact member 104 and a corresponding contact member 105 is carried by the movable plate 84. On the shaft 71 on the opposite end from the gear 73 is mounted a beveled pinion 106, to which is meshed a pinion 107 mounted on a shaft 108. Shaft 108 is mounted in bearings 109 supported on a standard 110. Intermediate the end bearings 109 is a bearing 111 which carries a contact member 112 forming one pole of a switch, the other pole of which is carried and controlled by the governor 113.

The movable plate 84 also carries a projection 114 to which is connected a cable 115. Cable 115 is guided over rollers 116 which are mounted on an arm 117 secured to the standard 65. Cable 115 leads to and is connected with a suitable alarm or pull bell 118.

Mounted in a support 119 is a governor 120, the lower end 121, of which constitutes one pole of a switch. The opposite pole 122 of the switch is carried by the frame. The governor shaft 123 has mounted on its lower end a beveled pinion 124 which is in mesh with a beveled pinion 125. Member 125 is mounted on stub shaft 126 which is mounted in any suitable bearings 172 carried by the frame 119. On shaft 126 is mounted a large grooved wheel 127 over which cable 1 travels.

The endless cable 1 is fed in over a roller 128 carried by the upper end of the standard 65, thence over the rollers 68 to the rollers 103 and back and forth to the center of the device where it is led upward over the grooved wheel 127 and back again to the rollers 103, thence back to the rollers 68 and back and forth to the other standard 65 where it is again carried off over a corresponding roller 128 and thence to the protected windows or elsewhere out through the system.

Whenever the endless cable strung across windows, doors or elsewhere is tampered with, should the cable be broken or severed it will result in the retarding of governor 120, gravity will cause the arms of the governor to lower and thus lower pole 121 into contact with pole 122, closing the circuit and thereby sounding the alarm. Should the endless cable be pulled or stretched out of its normal position the increased tautness will tend to lift the plate 84, thereby raising the contact finger 105 into contact with the finger 104, thus closing a circuit and sounding an alarm.

When endless chain 63 is employed in the mechanism, if the chain is tampered with the governor 99 will be retarded and its pole moved into electrical contact with contact 98. This operation occurs through the gears 93 which mesh with gears 92 on shaft 88, thence through gear 91 to the meshed gear 96 on shaft 97, which drives the governor 99.

Referring to Figs. 13 and 14 means for locking and for releasing doors protected by my alarm system is illustrated. Fig. 13 illustrates the invention applied to a glass paneled door, to permit of its being released from sealed position by any authorized person. The framework of the door comprises casements 5 secured to each other as shown in detail in Fig. 6, in which is mounted a glass panel. At one side of the door, near the upper portion and opposite from the hinge side is mounted a small casement 129, one side of which is fastened rigidly to the wall. The other half of the casement is removably or releasably mounted to the fixed portion of the casement. The removable portion is held in place by bolts 130. Mounted within the fixed or rigid half of the casement 129 are suitable grooved rollers 131 (two being illustrated in Fig. 13) over which cable 1 from the door is led. The cable passes through apertures 132 in the edge of the door casement. Each of the halves of casement 129 is provided on forward side with registering notched portions forming apertures 133, through which cable 1 travels to and over rollers 131.

Midway the pipe 29 intermediate its ends there is provided a casement 134 carrying two small grooved rollers 135. Mounted on the wall on the hinged side of the door is a plate 136 provided at each of its longitudinal edges with cleats 137. A casement 138 is provided, carrying a single roller 139 over which the cable 1 travels. The rear half of casement 138 is provided with lateral tongues 140 which extend under the cleats 137. Provided on the rear end of casement 138 is a slotted projection 141, extending through which is a suitable set screw 142 mounted to a plate 143 on the rear end of the plate 136.

When it is desired to open the door and additional slack is required to prevent breakage of the cable 1, the set screw 142 is released and the casement 138 moved forward by means of the slotted projection 131, sufficient to allow the roller 139 to supply the slack to the door cables.

Upon releasing bolts 130 the outer half of casement 129 may be removed, thereby giving easy access to rollers 131. Cable 1 may then be slipped off from rollers 131, thus permitting the door to be swung open without stopping the operation of the endless cable.

In Fig. 14 there is illustrated a means for protecting an ordinary wooden door. A small casement 144 containing a single roller 145 is fastened to the door. To the locked side of the door is a casement 129 containing a single roller 146, over which the cable 1 is operated. To the wall on the hinge side of the door is mounted a plate 136 provided with cleats 137, under which are disposed extensions 140 of the rear end of a casement 138, each half of which carries a roller 147, as illustrated. A small plate 148 carrying two antifriction rollers 149 is fastened to the wall, over which the cable runs.

The cable is led in over one roller 149, thence over one of the rollers 147 to and through the casement 145 on the door and over the roller 146, carried in casement 149. Thence it is led back and through the casement 144 again, and thence to the casement 138, over roller 147 and thence over roller 149.

When it is desired to open the door the set screw 142 securing the casement 138 in fixed position is released, permitting the casement 138 to be slid forward, thus giving slack to cable 1, and permitting the portion of cable 1 traveling over roller 146 to be removed therefrom. When this is done the door may be opened, and without interrupting the operation of the alarm mechanism. Casement 129 is normally secured in locked position, so that only an authorized person may have access to it.

Referring to Fig. 15, there is illustrated operatively combined means for driving both rollers and ratchets, where both cords and chains are employed to complete the protective mechanism.

Referring to Fig. 16 there is illustrated an enlarged detail of the governor mechanism.

Referring to Fig. 17 there is illustrated a horizontal section through governor shaft 123 and showing the guides 159 by which the rotatable governor plate 160 is retained in engagement with the lower end 121 of the governor, the latter member being vertically movable but non-rotatable by reason of the engagement of extended portions or arms 161 in slotted portions 162 of the governor frame member 119. Fig. 18, which is a vertical section through Fig. 17, further illustrates the detailed construction of the governor mechanism.

Referring to Fig. 19 there is illustrated in detail the means for the telescopic operation of governor shaft 97. One section of shaft 97 is rigidly secured to a suitable sleeve 163 within which the other section of shaft 97 is slidably mounted but retained against rotation by means of a suitable projection 164 slidably positioned within an interior vertical groove 165 in sleeve 163.

The operation of the invention has been set forth in connection with the foregoing description of the construction disclosed in the views described. The cable 1 is continuously traveling and as it is taut, any stretching or movement out of its regular path will exert such tension on the alarm mechanism as to reduce the speed of the governor, close the switch, and thus sound the alarm in consequence of the closing of the switch. It is within the contemplation of my invention to provide either a cable, a chain or a wire as the continuously traveling element, and the words "traveling element" when used in the claims are to be construed as referring to any of the foregoing members. It is also within the contemplation of my invention to provide any suitable form of incasing mechanism for the endless traveling element. The drawings illustrate my preferred form. It is further within the contemplation of my invention to provide any suitable form of grooved roller or wheel for mounting and supporting the cables or chains, and the word "roller" as used in the claims shall be construed as applying to any suitable rotatable element adapted to support the "traveling element." I may provide suitable weights, such as removable weights 170, illustrated in Fig. 28, these weights being attached by any suitable screws as illustrated in Fig. 28, in connection with the propelling mechanism to compensate for the weight of an unusually long traveling element, and similarly to compensate for the diminished weight by its subtraction if an extra short traveling element is employed, thus keeping the endless traveling element taut throughout its length. Any separation or movement of the parallel lengths of the endless cable at any angle to their line of travel in even a slight degree will sufficiently retard the governor as to cause the alarm to be sounded.

What I claim is:

1. In apparatus of the class described, the combination of an endless traveling element arranged across or adjacent to portions of a structure to be protected, and means for mounting the endless traveling element.

2. In burglar alarm mechanism, the combination of an endless moving cable having parallel lengths operating across or adjacent to portions of a structure to be protected, and spaced means for mounting the endless cable.

3. In burglar alarm mechanism, the combination of an endless traveling element arranged to operate adjacent to portions of a structure to be protected, means incasing the endless traveling element, and means supporting the cable in operative positions.

4. In burglar alarm mechanism, the combination of a plurality of endless traveling elements each element being disposed to cause adjacent portions of that element to travel in substantially parallel relation across portions of a structure to be protected, and means for supporting the endless cables in close but spaced relation to each other.

5. In burglar alarm mechanism, the combination of an endless traveling cable, roller members over which the cable operates, casements, means for mounting the roller members within the casement, the walls of the casements having apertures for the passage of the traveling cable.

6. In burglar alarm mechanism, the combination of an endless traveling element, rotatable members over which the traveling element operates, casements, means for mounting the rotatable members within the casements, the walls of the casements having apertures for the passage of the traveling chain.

7. In burglar alarm mechanism, the combination of an endless traveling element, rotatable elements over which the traveling element operates, casements having parallel walls, means for mounting the rotatable elements within the parallel walls, the walls having apertures for the passage of the traveling element.

8. In burglar alarm mechanism, the combination of an endless traveling element, rotatable elements over which the traveling elements operates, casements having depending interior flanges, means for mounting the rotatable elements to the depending flanges, the walls of the casements having apertures for the passage of the traveling element.

9. A burglar alarm apparatus having in combination an endless traveling element, rotatable members over which the traveling element operates, means for mounting the rotatable elements in substantially parallel spaced but close relation across portions of a structure to be protected against unauthorized entry, and an alarm mechanism operatively connected with the traveling element and arranged to be sounded when normal movement of the traveling element is interfered with by breaking, stoppage, stretching, retardation or any movement from its normal operating positions.

10. A burglar alarm apparatus having in combination an endless traveling element, means operatively supporting the aforesaid member in spaced parallel lengths adjacent to a structure or part thereof to be protected, an electric switch, governor mechanism maintaining the switch in predetermined position during the continuous operation of the traveling element and reversing its position upon interference with the regular movement of the traveling element, an alarm electrically connected with the switch and operated therefrom.

11. A burglar alarm apparatus having in combination a continuously moving endless traveling element, means supporting the traveling element in any desired operative position adjacent to walls, doors, etc., to protect a building or other structure, an alarm mechanism, an electric switch, means normally holding the switch in open position, means operatively connecting the switch and endless traveling element to sound the alarm upon any interruption of the movement of the endless traveling element.

12. A burglar alarm apparatus having in combination endless traveling elements, means supporting the aforesaid endless elements in juxtaposition in any desired operative position adjacent to walls, doors, etc., to protect a building or other structure from burglary, a plurality of electrically operated alarms, governor switches for the alarms, a plurality of operatively connected mechanisms propelling the traveling elements, circuits arranged to electrically operate all alarms upon operation of any of the switches, said switches being actuated by any interference with the continuous travel of either endless element.

13. A burglar alarm apparatus having in combination an endless traveling element disposed in protective position relative to the walls of a building, roller means for mounting same, mechanism propelling the endless traveling element, an alarm, a governor operatively connected to the propelling mechanism having a switch element arranged to close an electric circuit upon unauthorized interference with the movement of the traveling element by its stoppage, retardation, severance and the like, and an electric circuit arranged to sound the alarm upon closing of the switch controlled by the governor.

14. A burglar alarm apparatus having in combination an endless traveling element, sprockets supporting same in operative moving protective relation to any structure to be protected against unauthorized entry or exit, mechanism propelling the traveling element, an alarm, a circuit adapted to electrically connect the alarm with a governor-controlled switch, and a governor-controlled switch normally held open by the normal operation of the mechanism propelling the traveling element and arranged to close and sound the alarm upon the occurrence of tampering or interference with the normal continuous operation of the traveling element.

15. A burglar alarm apparatus having in combination an endless traveling element, means supporting same in operative position, a motor propelling the endless traveling element, an electric circuit electrically connected with the motor, an alarm, a circuit adapted to electrically connect the motor and the alarm, a governor switch in the circuit maintained in open position by the normal operation of the mechanism and adapted to be closed upon any cessation of normal operation of the apparatus whereby stoppage, retardation, severance and like interference with the movement of the traveling element, and whereby cutting of the house wire electric circuit connected with the motor will allow the governor switch to close by gravity and sound the alarm, substantially as set forth.

16. In apparatus of the class described, the combination of an alarm, an electric circuit, a governor-controlled switch in the circuit, means for retaining the switch in non-rotatable but vertically movable relation to the governor by which it is controlled, a propelling device for continuously operating endless traveling elements, operative shaft and gear connections between the propelling device and the governor-controlled switch, electrical means including an electric supply cable electrically actuating the propelling device, whereby cutting of the electric supply cable will release the governor from open position and sound the alarm.

17. In apparatus of the class described, the combination of an alarm, an electric alarm circuit, governor-controlled mechanism in the circuit the circuit being held open by the normal operation of the governor, an endless traveling element operatively related to the governor and upon the continuous movement of which the normal operation of the governor is determined, an electric motor, a motor shaft to which the governor mechanism is directly geared, and an electric supply cable the cutting of which will stop the governor and sound the alarm.

18. In apparatus of the class described, the combination of a plurality of alarms, a plurality of endless traveling elements, an electrically-operated device propelling the traveling elements, a governor, an alarm electrically connected with and controlled by the governor, electrical means actuating the propelling device, and operative connections between the elements set forth, whereby interference with the normal operation of any portion of the traveling element of the elements of the apparatus will sound all the alarms, substantially as described.

19. A burglar alarm system having in combination an endless traveling element, incased means supporting the endless traveling element in operative position in interlaced preferably parallel disposition over doors and windows, auxiliary incased door-locking means mounted at one side of a door or the like for releasably retaining a portion of the endless traveling element in position across the edge of and locking the door, slack-giving mechanism on the opposite side of the door over which a portion of the endless traveling element operates adapted to give sufficient slack to permit an authorized person to disengage the traveling element from the door locking means to open the door without sounding the alarm, an electrically operated propelling device driving the endless traveling element, a governor operatively connected with the propelling device, an electric circuit normally kept open by the normal operation of the governor, and an alarm arranged to be sounded when any of the aforesaid mechanism is tampered with.

20. A burglar alarm system having in combination an endless traveling element, incased means supporting the aforesaid traveling element in operating position adjacent to walls, doors, spaces, etc., to be protected from unauthorized entry or exit, means slidably mounted on opposite sides of windows, etc., for supporting the endless traveling element across the window and adapted to be moved to one side of the window to leave it clear, compensating mechanism to give slack to the traveling element to admit of its being moved to one side of a window from its normal position to leave the window clear to any authorized person, electrical means propelling the endless traveling element, a governor operatively connected with the propelling means, an alarm electrically associated with the governor and arranged to be sounded upon any retardation of the governor.

21. In apparatus of the class described, the combination of auxiliary incased protecting mechanism mounted at one side of a door for releasably retaining a portion of the endless traveling element in protective position, slack-giving mechanism on the opposite side of the door over which a portion of the endless traveling element operates, and an endless traveling element.

22. In apparatus of the class described, the combination of means slidably mounted on opposite sides of windows, etc., for supporting the endless traveling element across the window and adapted to be moved to one side of the window to leave it clear, compensating mechanism to give slack to the traveling element to admit of its being moved to one side of a window from its normal position, whereby to leave the window clear.

23. In combination with a burglar alarm apparatus, an endless traveling element, a door comprising a plurality of box-like casements secured one to the other, depending flanges extending longitudinally within the casements, grooved roller members mounted in rotatable relation and alined position on the casement flanges, the casements having orifices for the entrance and exit of the traveling element, substantially as and for the purposes described.

24. In combination with a burglar alarm device, a casement comprising like hollow members each having outturned abutting flanges, means fastening the casement members in alined abutment, flanges within the casement members, rollers mounted to the flanges, said casement having orifices for the passage of a traveling element, for the purposes described.

25. In apparatus of the class described, the combination of casement members mounted to opposite sides of a window frame, the casements having longitudinally grooved bars, slide blocks slidably mounted to the grooved bars, rollers mounted on the slide blocks, an endless traveling element interlaced over the rollers and across the window space, and means adapted to engage opposite slide blocks for moving the mechanism to one side to leave the window space clear, substantially as described.

26. In burglar alarm mechanism, a slack supplying device comprising a frame having a crossbar at its upper end, rollers mounted on the crossbar, grooved guide bars extending longitudinally of the frame, tongued blocks slidably mounted to the guide bars, blocks adjustably mounted on the tongued blocks, rollers mounted on the latter blocks, an endless traveling element interlaced over the rollers, means attached to the frame for adjustably controlling the position of the tongued blocks, and fastening means for the respective block members, whereby the blocks may be adjusted to supply slack to the traveling element, substantially as described.

27. In burglar alarm apparatus, mechanism for blocking and releasing a door by means of a traveling cable, comprising a door having rollers mounted thereon, a traveling element interlaced over the rollers, an apertured casement mounted to the wall opposite the hinge side of the door, a roller in the casement releasably supporting the traveling element, and a slack-giving device mounted to the wall on the hinge side of the door.

28. In apparatus of the class described, mechanism for locking and releasing a door by means of a traveling cable, comprising means for engaging the cable to mechanism mounted at one side of the door, and a slack-giving device on the opposite side of the door consisting of a plate mounted to the wall the plate having longitudinal cleats, a casement having lateral tongues extending under the aforesaid cleats, a single roller mounted in the casement and supporting the traveling cable, a slotted projection on the casement, and a fastening member mounted in the slotted projection, whereby to adjust the casement in the desired position to provide slack cable, substantially as and for the purposes described.

ROBERT W. VAIL.